United States Patent

Nusbickel, Jr.

[15] 3,640,122
[45] Feb. 8, 1972

[54] ULTRASONIC DEFECT SIGNAL DISCRIMINATOR

[72] Inventor: Edward M. Nusbickel, Jr., Allentown, Pa.
[73] Assignee: Bethlehem Steel Corporation
[22] Filed: Nov. 20, 1969
[21] Appl. No.: 878,482

[52] U.S. Cl. .............................................. 73/67.9
[51] Int. Cl. ...................................... G01n 29/00
[58] Field of Search ............... 73/67.5, 67.7, 67.8, 67.9

[56] References Cited

UNITED STATES PATENTS

| | | | |
|---|---|---|---|
| 3,009,353 | 11/1961 | Erdman | 73/67.9 |
| 3,362,011 | 1/1968 | Zemanek | 340/18 |
| 3,427,867 | 2/1969 | Nute et al. | 73/67.9 |
| 3,482,434 | 12/1969 | Cowan et al. | 73/67.8 |

Primary Examiner—Richard C. Queisser
Assistant Examiner—Arthur E. Korkosz
Attorney—Joseph J. O'Keefe

[57] ABSTRACT

Ultrasonic instrument with pulsed transducer provides a plurality of gating pulses and analog output signals related to test piece surface spacing and defect characteristics. Separate transposition, ratio, and other defect signal discriminators sample these output signals simultaneously and, by means of logic elements combined with a "strobe" gate, provide for characterizing defects and occurrences of events. A transposition alarm is enabled when two different analog signals rise and fall relative to respective thresholds according to a prescribed sequence. A ratio alarm is enabled when, for example, the defect and rear surface analog signals are compared and they exceed a predetermined ratio thereof. A third alarm is enabled when defects occur that are not characterized by the transposition or ratio methods.

10 Claims, 5 Drawing Figures

PATENTED FEB 8 1972

INVENTOR
Edward M. Nusbickel, Jr.

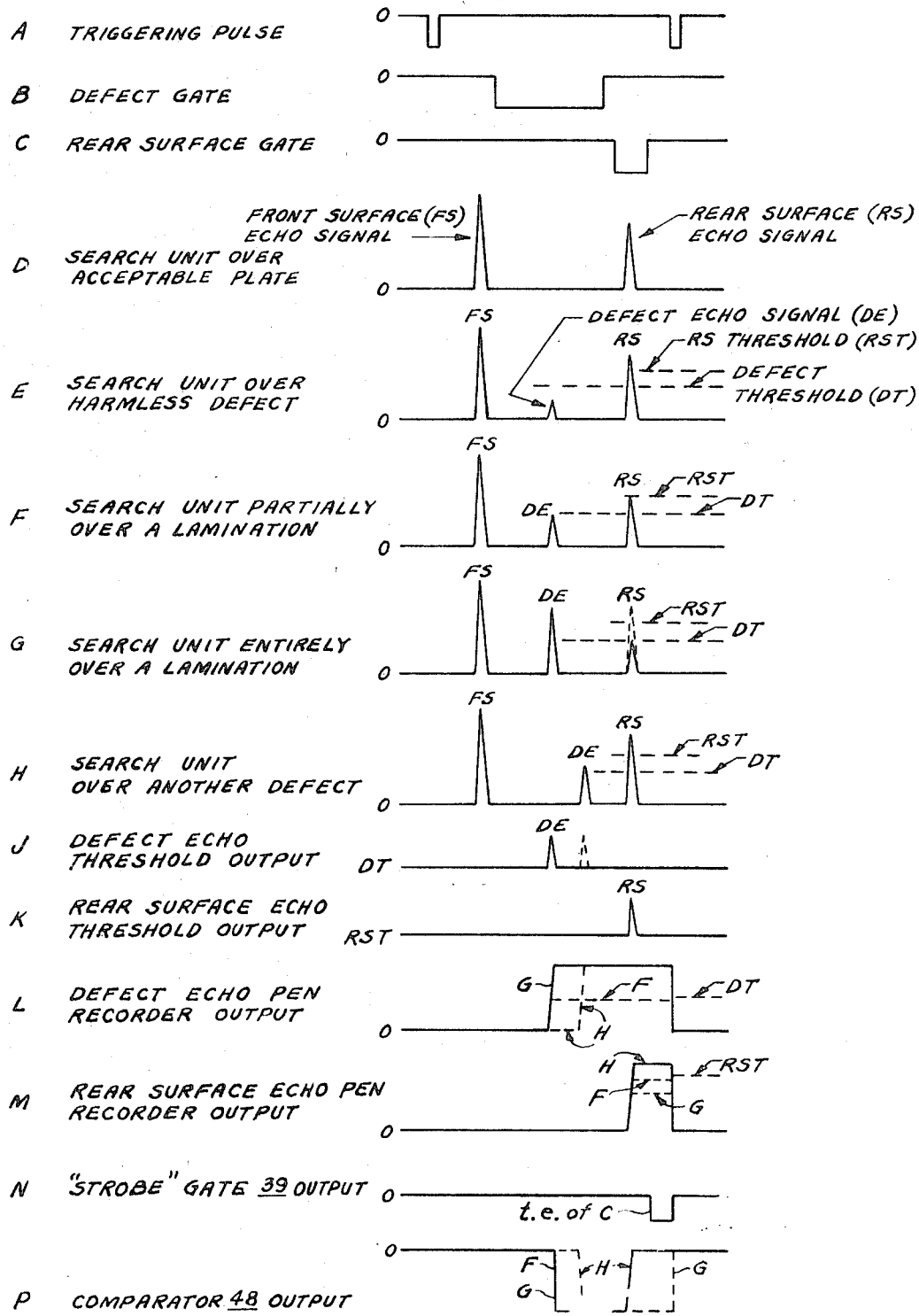

ULTRASONIC DEFECT SIGNAL DISCRIMINATOR

BACKGROUND OF THE INVENTION

This invention relates to ultrasonic nondestructive testing apparatus. More particularly, it relates to ultrasonic apparatus including electronic means for automatically discriminating between various echo signals representative of different types of surfaces and defects in a test piece.

Generally, in ultrasonic nondestructive testing of a metal plate, for example, a transducer is caused to scan the surface of the plate and to transmit and receive pulsed ultrasonic energy to and from the plate by way of a coupling media. The ultrasonic energy is repeatedly reflected between front and rear surfaces of the plate, thereby producing a sequence of echoes which are converted to electronic signals and fed to an ultrasonic instrument. The manner in which the ultrasonic energy is reflected, or its through transmission blocked, appears as visual information on a display in the ultrasonic instrument.

Heretofore, determinations such as size and depth of laminations, voids, inclusions and other defects, as well as thickness and other parameters of the plate, were frequently made by one or more visual interpretations of reflected signals appearing on the display. This procedure not only requires that a test be conducted at a slow rate so that an operator may observe the display, but also requires his constant attention to follow signal changes. Thus, it is apparent that such procedures provide a number of difficulties in meeting contemporary ultrasonic test requirements of high accuracy, reliability and speed of operation.

For example, even in hand scanning a plate, if the transducer is moved rapidly over a defect, the echo signal is very difficult to observe. Hence, the operator resorts to increasing instrument gain in an effort to make echo signal observation easier. As a consequence, when a lamination defect is suspected, the ultrasonic instrument must be recalibrated and repeated slow passes made over the suspect area of the plate to obtain a confident visual interpretation of the echo signals. This is important because industry accepted procedures require a rise in the lamination defect signal accompanied by a loss of the rear surface echo signal. Thereafter, the latter signal may be replaced by a multiple defect signal. This change in relative amplitudes of the defect echo and rear surface echo signals in the aforementioned sequence, and the possible substitution of a multiple of the defect signal for the rear surface signal, is sometimes referred to, as it will herein, as the transposition method of detecting lamination defects.

Another industry procedure used to determine the presence of both lamination and other defects is to visually compare the amplitude ratio of the defect echo signal to the rear surface echo signal. However, because it is both difficult and time consuming to visually determine the ratio of two signal son the display, operators have found it expedient to adjust ultrasonic instrument gain so as to maintain the rear surface echo signal at a fixed amplitude. This requires visual monitoring of only the defect echo signal relative to a fixed amplitude. However, it is difficult to keep the rear surface echo signal constant because variations in the coupling of ultrasonic energy to and from the plate cause echo signals to vary greatly, as much as ±50 percent. As a result, repeated passes of the transducer over the suspect area and recalibration of the instrument are also required before confident visual interpretation of the defect echo signal may be made.

From the foregoing difficulties in making visual observations and interpretations of the display, it is apparent that ultrasonic instrument vertical gain linearity is an important calibration parameter. An instrument with a linear vertical gain characteristic will have a constant amplification factor for any input signal. An ultrasonic instrument with a nonlinear gain characteristic will amplify disproportionately some echo signals received by the instrument, thereby introducing unwanted errors in judging the severity of defects and timing of echoes. Heretofore, gain linearity checks were time consuming, required additional instrumentation or reference defect standards and did not overcome human variations in observing signal displays.

SUMMARY OF THE INVENTION

One of the objects of this invention is to provide improved ultrasonic apparatus for nondestructive testing of a test piece.

A further object of this invention is to provide ultrasonic apparatus which automatically distinguishes between various types of defects without human interpretation, yet increase reliability of signal evaluation.

Other objects of this invention are to ultrasonic apparatus which samples and automatically processes echo signals to determine the occurrence of the transposition sequence, or the amplitude ratio, of two related echo signals when differing from predetermined values thereof, or if the echo signals are caused by other defects, all while minimizing noise effects.

Still other objects of this invention are to provide ultrasonic apparatus which permits ultrasonic energy coupling variations without affecting a monitored ratio of the related echo signals; which permits rapid interpretation of the echo signals in one inspection pass over the test piece; which permits instrument operation without frequent recalibration or constant readjustment to instrument gain or either front or rear surface echo amplitude; and which permits a rapid check on instrument gain linearity without the use of additional instrumentation.

Other and further objects of this invention will become apparent during the course of the following description and by reference to the accompanying drawings and appended claims.

The foregoing objects can be attained with ultrasonic apparatus having a transducer, an ultrasonic instrument for pulsing the transducer cyclically and for issuing a sequence of triggering and synchronized gating pulses and a related sequence of amplitude variable echo signals received from the transducer during each of its pulse cycles, electronic signal discriminator means including separate transposition, ratio and other defect signal circuits which sample the ultrasonic instrument output signals simultaneously and, by means of logic elements combined with a "strobe" gate, provide output signals which distinguish, for example, lamination defects by either the transposition or the ratio means from other defects, and alarm means responsive to the discriminator means outputs signals for signalling the occurrence of, and deviation from, predetermined echo signal amplitude and/or sequence requirements.

DESCRIPTION OF THE DRAWINGS

FIG. 5 is a series of waveforms.

DESCRIPTION OF THE PREFERRED EMBODIMENT

Figure 1:
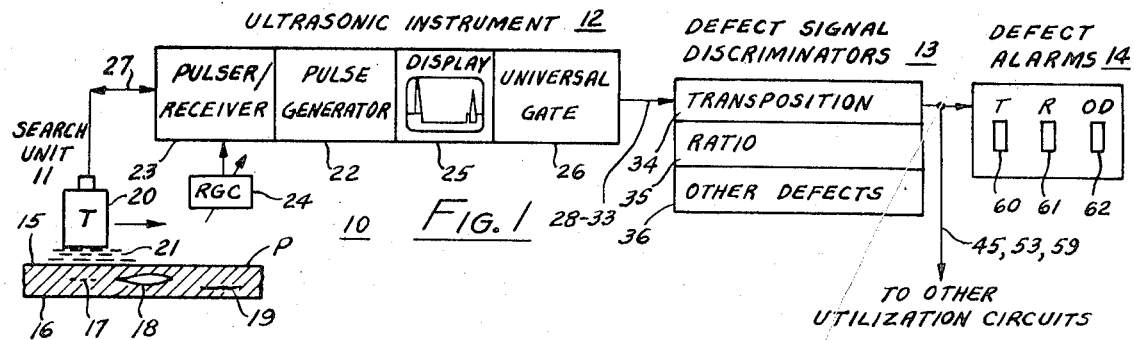
FIG. 1 is a schematic diagram of one embodiment of the present invention.

Referring to the drawings, particularly FIG. 1, there is generally shown ultrasonic nondestructive testing apparatus 10 operatively associated with a test piece which, for illustrative purposes, may be a steel plate P. Ultrasonic apparatus 10 comprises search unit 11, ultrasonic instrument 12, defect signal discriminators 13 and defect alarms 14. The test piece, plate P, is shown having front and rear surfaces 15, 16, an acceptable or harmless defect 17 and a lamination or void defect 18 about midway between surfaces 15, 16, and another defect 19, such as an inclusion, closer to surface 16 than to surface 15.

Search unit 11 is adapted for relative movement with plate P and includes an ultrasonic transducer 20 which is mounted normal to plate surface 15 and adapted to transmit and receive ultrasonic pulsed energy to and from plate P. If desired, a liquid couplant 21, supplied from a source not shown, may be used in the acoustical pathway between transducer 20 and plate P. A suitable search unit 11 found satisfactory for inspecting steel plates, for example, is a single transducer embodiment of that disclosed and claimed in my copending application, Ser. No. 878,481 filed Nov. 20, 1969, now U.S. Pat. No. 3,616,684 entitled "Ultrasonic Inspection Carriage" and assigned to the assignee herein.

Ultrasonic instrument 12 consists essentially of pulse generator 22, pulser/receiver 23, including variable receiver gain control 24, a cathode ray tube (CRT) type of signal display 25, and a universal gate section 26, all as described below. A commercially available ultrasonic instrument exemplifying instrument 12 is one manufactured by Branson Instrument Co., Stamford, Conn., their model series 600. A description of its major components follows.

Briefly, pulse generator 22 includes a clock having an output pulse rate adjustable between about 60 to about 900 Hz. The clock output is fed directly to pulser/receiver 23 and through a slight time delay (not shown) as waveform FIG. 5A to display 25 for synchronizing the CRT sweep circuit and to universal gate 26 for triggering an interface gate.

Pulser/receiver 23 includes an ultrasonic signal pulser which, under control of the clock in pulse generator 22, transmits pulsed electronic signals to transducer 20 by way of circuit 27. A sequence of pulse echo signals, corresponding to front and rear surface echoes and defect echoes shown as FIGS. 5D to 5H waveforms, are returned over circuit 27 to an ultrasonic signal receiver included in pulser/receiver 23. This receiver includes circuit means for limiting the magnitude of received pulser transmission signal during the beginning of each pulse cycle. It also includes a variable gain control 24 for varying the amplification of echo signals and therefore the overall calibration of ultrasonic instrument 10. Display 25 is fed amplitude variable pulse echo signals from the receiver portion of pulser/receiver 23 and images such waveforms as shown in FIGS. 5D to 5H on the screen of its CRT. In addition, display 25 receives defect gate and rear surface gate pulses, FIGS. 5B, 5C, from universal gate 26, yet to be described, and produces a composite waveform image such as illustrated in display 25 portion of FIG. 1 schematic diagram.

Universal gate 26 provides sampling and selected pulse echo signals for automatic discrimination of prescribed pulse relationships to distinguish between laminations, for example, from other types of defects. With these purposes in mind, universal gate 26 is fed the triggering pulse, FIG. 5A, from pulse generator 22 and amplitude variable pulse echo signals, such as are shown in FIGS. 5D to 5H, from the receiver portion of pulser/receiver 23. Triggering pulse, FIG. 5A is also used externally and is fed to output circuit 28. Universal gate 26 also includes adjustable circuit means for generating three adjustable-width gating pulses, viz, (1) an interface gate in response to the triggering pulse FIG. 5A, (2) a defect or flaw gate, FIG. 5B and (3) a rear surface gate, FIG. 5C, all of which are synchronized with the triggering pulse. The latter two gates act in response to the interface gating pulse and limit subsequent processing of the defect echo and rear surface echo portions of the receiver output signal, respectively, to those intervals shown in FIGS. 5B, 5C. The rear surface gating pulse is also used externally and is fed to output circuit 29. In addition, universal gate 26 includes defect echo and rear surface echo threshold detectors which receive the analog variable echo pulses fed from the above-noted receiver and act against respective but different present amplitude reference signals, and then only in response to, and during the presence of, the defect and rear surface gating pulses, respectively. When the amplitude of the respective echo signals exceeds the threshold, or reference level, then defect and rear surface echo threshold signals, FIGS. 5J, 5K, are fed to output circuits 30, 31, respectively. Finally, universal gate 26 incorporates separate sample and hold circuitry for each of the variable defect echo and rear surface echo portions of the analog signal fed from the above-noted receiver. Sampling starts at the onset of their respective gating pulses, FIGS. 5B, 5C and is released at, for example, the onset of the triggering pulse of next pulse cycle. These tracking circuits vary in amplitude as shown in FIGS. 5L and 5M, respectively, and are fed externally as defect echo pen recorder output and rear surface echo pen recorder output signals over output circuits 32 and 33, respectively.

It is to be noted that all of universal gate 26 output signals fed over circuits 28 to 33 with the exception of the rear surface gate on circuit 29, are available as standard outputs from the Branson model series 600 ultrasonic instrument. The rear surface gate output on circuit 29 is derived by tapping the existing rear surface gating circuitry mentioned above. It will become apparent that other modifications may be made to the same or similar circuitry, or to entire instruments, to achieve the same or equivalent output signals utilized in subsequent signal processing.

Defect signal discriminators 13 receives the universal gate 26 output signals over circuits 28-33 and samples and automatically processes pulse and echo signals FIGS. 5A, 5C, 5J-5M. This is done electronically by transposition, ratio, and other defect signal discriminators 34, 35, 36, respectively, to determine the occurrence of the transposition sequence, or the amplitude ratio, of two related echo signals when differing from predetermined values thereof, or if the echo signals are caused by other defects. Although not limited to lamination detection, lamination 18, for example, may be detected without human interpretation of display 25 by both the transposition and ratio discriminators 34, 35 as will be described below.

Figure 2:
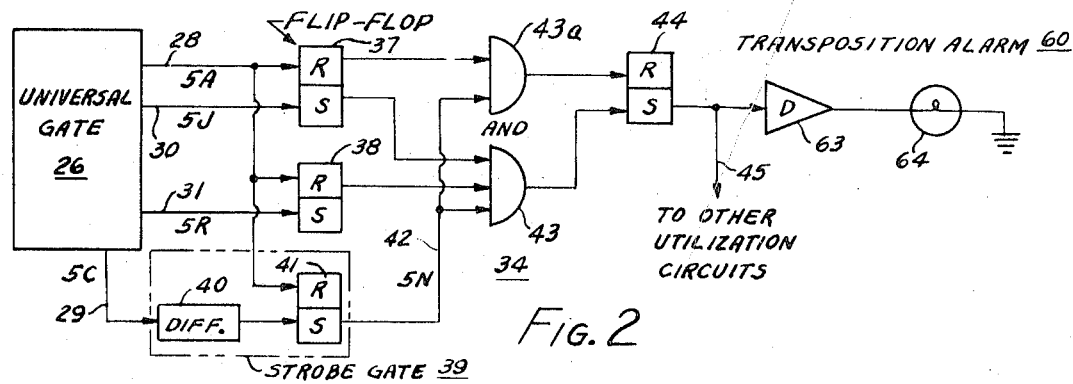
FIGS. 2–4 are schematic diagrams of respective transposition, ratio and other defects electronic defect signal discriminators utilized in the FIG. 1 embodiment.

Referring now to FIG. 2, there is shown transposition defect discriminator 34 which electronically discriminates between laminations and other less harmful defects. This is done in much the same manner as a human operator visually interprets ultrasonic echo signals on display 25 when following industry accepted procedures. That is, principally a reduction in rear surface echo signal, or a loss of it entirely, and a corresponding increase in defect echo signal. To effect this, logic elements, such as conventional set(S)-reset(R) flip-flops having set and reset inputs and outputs, are combined with a "strobe" gate, described below, to sample the amplitude and sequence of defect echo and rear surface echo signals received from universal gate 26 during each triggering pulse cycle.

Flip-flop 37 is set by the defect echo threshold output signal, FIG. 5J, circuit 30, and reset by the onset of triggering pulse, FIG. 5A, circuit 28. Flip-flop 38 is set by the rear surface echo threshold output signal, FIG. 5K, circuit 31, and reset also by the triggering pulse, FIG. 5A, circuit 28.

"Strobe" gate 39, an important feature of the discriminator circuitry, consists of differentiator 40 driven by the rear surface gating signal, FIG. 5B, circuit 29, and flip-flop 41 which is set by the trailing edge of differentiator 40 output, said trailing edge being in correspondence with the rear surface gating signal offset. Flip-flop 41 is reset by triggering pulse, FIG. 5A, circuit 28, in synchronism with flip-flops 37, 38 at the beginning of each triggering pulse cycle. "Strobe" gate output signal, FIG. 5N, circuit 42, is caused to occur as late in each pulse cycle as is practical for comparison purposes. This has two advantages, viz, it minimizes noise effects because of signal stability in that part of the pulse cycle and, in addition, increases reliability of echo signal evaluation.

The set output of flip-flop 37, the reset output of flip-flop 38, and the set output of flip-flop 40 of "strobe" gate 39 comprise the inputs to a three-input AND-gate 43. AND-gate 43 in effect monitors electronically the proper sequence of the rise and fall of the defect echo and rear surface echo signals relative to their respective thresholds. In actual operation, AND-gate 43 is enabled only when (a) there is a rise in the defect echo signal above its threshold, (b) there is at least a momentary fall in the rear surface echo signal below its threshold, or not preset at all, and (c) there is a "strobe" gate 39 output signal.

When search unit 11 is over an acceptable portion of plate P, FIG. 5D, AND-gate 43 is inhibited and no defect signals are produced. As search unit 11 moves over an acceptable defect 17, FIG. 5E, the defect echo signal starts to rise, but being below its threshold, AND-gate 43 is still inhibited and no defect signal is provided. When search unit 11 is partially over lamination 18, FIG. 5F, the defect echo signal rises and the rear surface echo falls toward their respective thresholds. AND-gate 43 has not been enabled.

As search unit 11 moves entirely over lamination 18, FIG. 5G, the defect echo rises above its threshold and the rear surface echo signal (solid line) falls below its threshold. When strobe gate 39 output is present, AND-gate 43 becomes enabled and its output sets flip-flop 44 which in turn cause the presence of a lamination signal on circuit 45. Flip-flop 44 remains in its set condition for as many triggering pulse cycles as search 11 is located over lamination 18, even though each of the other flip-flops 37, 38, 41, are reset every triggering pulse cycle.

When arch 11 is moved away from lamination 18, flip-flop 44 is reset by the output of AND-gate 43 at the end of the first triggering pulse cycle that this condition exists. The reset output signal of flip-flop 37 and the "strobe" gate 39 output signal comprise the inputs to AND-gate 43a, thus enabling AND-gate 43a only when (a) a defect is not preset and (b) a "strobe" gate signal is present.

An additional advantage of the combined action of AND-gates 43, 43a and flip-flop 44 is the fact that multiple defect echo signals commonly occurring during the rear surface echo gating interval, FIG. 5G dotted line at RS, does not falsely cause a "no-lamination" signal when lamination 18 is actually located under search unit 11. Ordinarily, this would occur because any signal, noise included, occurring during the rear surface gating interval with an amplitude greater than the rear surface echo signal threshold causes flip-flop 38 to set as would the rear surface echo signal, thus inhibiting AND-gate 43 and not setting flip-flop 44. However, in a previous triggering pulse cycle when flip-flop 37 was set by the presence of the defect echo threshold signal and flip-flop 38 was not set because of a momentary reduction, or loss, of the rear surface echo threshold signal, and the "strobe" gate 39 output signal was present, flip-flop 44 was set and caused the presence of a lamination signal to occur on circuit 45. This signal will remain on circuit 45 until flip-flop 44 is reset in response to the enabling of AND-gate 43a by the absence of a defect echo threshold signal and, hence the loss of a multiple defect echo signal, plus the presence of the "strobe" gate 39 output signal and AND-gate 43a inputs. This eliminates a false "no-lamination" signal condition when a multiple defect echo signal may replace a rear surface echo threshold signal during the rear surface gating interval.

Figure 3:
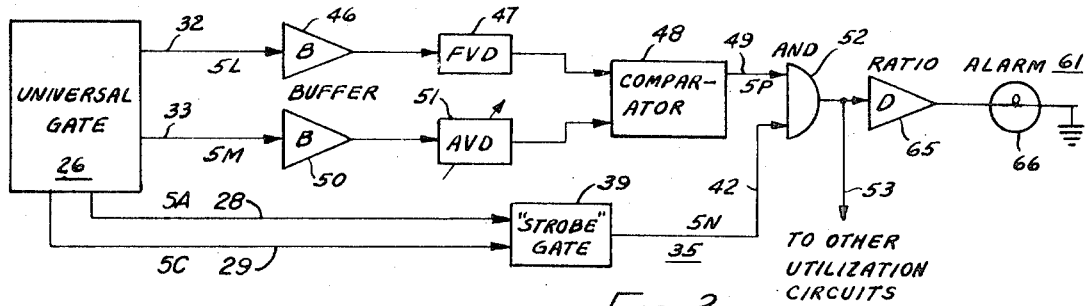

Turning now to FIG. 3, there is shown ratio discriminator 35 which also electronically discriminates between laminations and other defects in a manner different than transposition discriminator 34. This is accomplished by logic elements, in combination with the strobe gate, to sample the amplitude ratio of the amplitude variable defect echo and rear surface echo signals received from universal gate 26 during each triggering pulse cycle.

Buffer amplifier 46 receives the amplitude variable defect echo pen recorder output signal, FIG. 5L, over circuit 32 and feeds it to fixed voltage divider 47 whose purpose is to provide for a defect echo signal to rear surface echo amplitude ratio of greater than one. If an amplitude ratio of one or less is desired, divider 47 may be deleted. In either case, the analog variable defect echo signal fed by buffer amplifier 46 is applied as a reference signal to conventional comparator 48 which is applied voltage inputs and a digital pulse output signal, FIG. 5P, circuit 49. Buffer amplifier 50 receives the amplitude variable rear surface echo pen recorder output signal, FIG. 5M, over circuit 33 and feeds it to adjustable voltage divider 51 whose setting is made according to predetermined acoustical properties of plate P and those of the defects to be detected. Divider 51 output is fed to the second analog input of comparator 48.

When search unit 11 is over an acceptable portion of plate P, FIG. 5D, the rear surface echo signal is high and a defect echo signal is absent, thus causing comparator output to be absent on circuit 49. When search unit 11 moves toward or over a lamination, FIG. 5H, 5G, the defect echo signal goes high and the rear surface signal goes low. Thus, whenever comparator 48 reference voltage from divider 47 is equal to or greater than the voltage from divider 51, comparator 48 output will be present on circuit 49. In other words, the rear surface echo signal will be less than the defect echo signal which is indicative of a lamination because of the change in acoustical properties of, and pathways within, plate P in the region of lamination 18.

The output of comparator 48 over circuit 49, and the output of "strobe" gate 39 over circuit 42 comprise the inputs to a two-input AND-gate 52. AND-gate 52 in effect monitors electronically the amplitude ratio of the defect echo to the rear surface echo signals. When a comparator 48 output signal is present on circuit 49, and "strobe" gate 39 is enabled, then AND-gate 52 becomes enabled and its output on circuit 53 indicates, for example, the presence of lamination 18.

Figure 4:
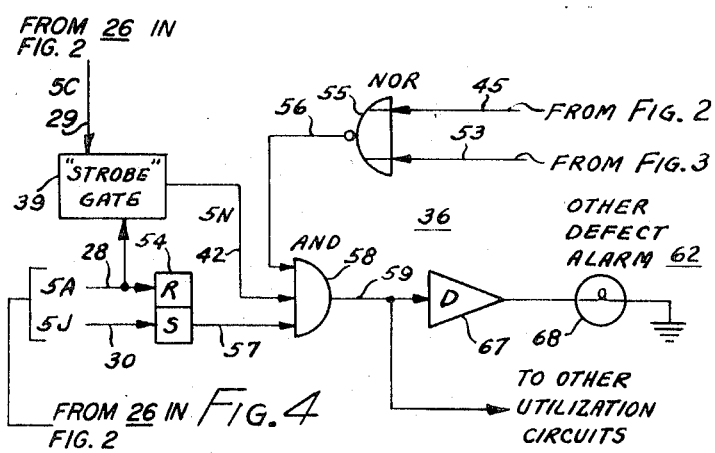

In FIG. 4, there is shown other defect signal discriminator 36 which electronically excludes lamination defects and responds only to other kinds of defects 19, such as inclusions, etc. This is also done with logic elements, in combination with the strobe gate, to sample the defect echo threshold output signal, FIG. 5J, received over circuit 30 from universal gate 26 during each triggering pulse cycle.

Flip-flop 54 is set when any kind of defect echo signal, FIGS. 5G or 5H, for example, is fed over circuit 30 and its amplitude is greater than a predetermined threshold. Flip-flop 54 is reset by the triggering pulse, FIG. 5A, circuit 28. Output circuits 45, 53 from transposition and ratio defect signal discriminators 34, 35, respectively, comprise inputs to two-input NOR-gate 55. NOR-gate 55 in effect monitors the other defect signal discriminators and provides an output signal on circuit 56 when an output signal is absent on circuits 45 and 53, and removes the signal on circuit 56 when either or both signals on circuits 45, 53 are present.

NOR-gate 55 output circuit 56, "strobe" gate 39 output on circuit 42, and flip-flop 54 set output on circuit 57 comprise inputs for a three-input AND-gate 58. AND-gate 58 in effect monitors electronically the defect echo signals for excess in defect threshold. However, it is enabled only when other defects 19 are present and then only during strobe gate 39 interval, FIG. 5N, and provided neither the transposition nor the ratio discriminators 34, 35 have detected a lamination. The presence of a signal on AND-gate output circuit 59 therefore indicates the presence of other defects 19 and the absence of such signal indicates either the absence of defects 19 or the presence of a lamination defect 18.

It is contemplated that the user of the present invention may prefer to interpret a plurality of different output signals, and their combination, rather than individual signals to distinguish between lamination 18 and other kinds of defects 19. In this case, other defect signal discriminator 36 may be deleted and the defect echo threshold signal, FIG. 5J on circuit 30 may be fed directly to other utilization means.

Referring now to the drawings in general, the transposition, ratio and other defect output signals fed from defect signal discriminators 13 over circuits 45, 53, 59 may be used in a variety of ways. For example, these signals may be used to drive defect markers or digital recorders or data processing system involved in the analysis of plate P. For illustrative purposes, these defect signals are fed to defect alarms 14, which comprise transposition defect alarm 60, defect ratio alarm 61 and other defects alarm 62. Each of these alarms, may be a light, buzzer etc., powered by a driver.

Transposition defect alarm 60 is enabled when an output signal from circuit 45 is fed to driver 63 which in turn causes light 64 to light. Ratio defect alarm 61 is enabled when an output signal from circuit 53 is fed to driver 65 which in turn causes light 66 to light. Other defects alarm 62 is enabled when an output signal from circuit 59 is fed to driver 67 which in turn causes light 68 to light. None of the defect alarms 60, 61, 62 are enabled when search unit 11 is located over an acceptable portion of plate P.

As mentioned above, an important feature of the present invention is that ultrasonic instrument 12 gain linearity may be checked rapidly and without additional instrumentation. This is carried out by placing a test piece having a known or standard lamination defect under search unit 11 and observing that ratio defect alarm 61 is enabled. Alarm 61 should remain enabled when receiver gain control 24 is adjusted throughout its entire range. This is because comparator 48 operates on a predetermined ratio rather than an amplitude principle and the predetermined ratio should remain constant regardless of gain control 24 setting. If alarm 61 does not remain enabled when gain control 25 is adjusted, then a nonlinear or an out of calibration condition exists. This condition may be overcome with a slight change in adjustable voltage divider 51 setting which may be sufficient to maintain instrument 12 within calibration tolerances. If the adjustment to divider 51 does not keep alarm 61 enabled, then gain linearity is out of tolerance and ultrasonic instrument 12 should be recalibrated.

Another advantage of ratio defect discrimination is the fact that considerable variation in acoustical coupling may occur between search unit 11 and plate P because such variations affect the amplitude of the pulse echo signals rather than their ratio. Hence, ratio defect discriminator 35 would not allow a lamination in plate P to go undetected as would an amplitude-sensitive instrument.

Additional scope and flexibility of the present invention may be had by adjusting variable voltage divider 51 in ratio defect discriminator 35 to a setting related to an acoustical property of plate P other than that of a lamination defect. In this manner, transposition defect discriminator 34 may be used to process lamination type of pulse echo defect signals, and the ratio defect discriminator 35 may be used to process pulse echo signals related to the other acoustical property of plate P. Thus, the two discriminators 34, 35 may be used to monitor two different properties of plate P, rather than two different methods of monitoring the same property.

I claim:
1. Ultrasonic nondestructive testing apparatus, comprising;
   a. means including a triggering pulse source, transducer means and receiver means for subjecting a test piece to pulsed ultrasonic energy and producing electrical pulse echo signals corresponding to a series of ultrasonic pulse echoes occurring during each pulse cycle,
   b. gating means responsive to means (a) for issuing at least one sequence of first and second amplitude variable pulse echo signals during corresponding first and second gating intervals after the triggering pulse, said gating means also issuing the triggering pulse and a second gating interval pulse,
   c. pulse echo signal amplitude discriminating means responsive to means (b) output for producing one or more echo initiated digital output signals synchronized with the second gating interval pulse and terminated by said triggering pulse and which correspond to one or more predetermined physical properties of the test piece, and
   d. means for utilizing the means (c) output to provide an indication of said physical properties of the test piece.

2. The apparatus of claim 1 wherein one of means (c) output signals is produced by means for detecting a predetermined amplitude reduction in the second pulse echo signal.

3. The apparatus of claim 2 wherein the detecting means is adapted to detect said amplitude transposition sequence and prevent a false output signal from occurring when a multiple of the first pulse echo signal is substituted for the second echo pulse signal during the second gating interval.

4. The apparatus of claim 1 wherein one of means (c) output signals is produced by means for detecting a predetermined amplitude ratio of the first to the second pulse echo signal.

5. The apparatus of claim 4 wherein means (a) receiver means includes an amplifier having a variable gain control to check amplifier gain linearity by observing if a change occurs in the amplitude ratio output signal when said gain control is varied while said transducer means is over the test piece.

6. The apparatus of claim 1 wherein means (c) includes "strobe" gate means responsive to the triggering pulse and the second gating interval pulse for controlling at least on of the means (c) outputs signals to limit signal passage to the latter portion of said triggering pulse cycle.

7. The apparatus of claim 1 wherein one of means (c) output signals is produced by means for detecting an amplitude transposition of the first and second pulse echo signals.

8. Ultrasonic nondestructive testing apparatus, comprising:
   a. means including a triggering pulse source, transducer means and receiver means for subjecting a test piece to pulsed ultrasonic energy and producing electrical pulse echo signals corresponding to a series of ultrasonic pulse echoes occurring during each pulse cycle,
   b. gating means responsive to means (a) for issuing a plurality of sequences of first and second amplitude variable pulse echo signals during corresponding first and second gating intervals after the triggering pulse, said gating means also issuing the triggering pulse and a second gating interval pulse,
   c. pulse echo signal discriminating means response to means (b) outputs for producing a plurality of output signals which distinguish between one or more predetermined physical properties of the test piece, said means comprising:
      1. "strobe" gate means responsive to the triggering pulse and the second gating interval pulse for producing an output control signal to limit passage of said output signals to the latter portion of said triggering pulse cycle.
      2. means responsive to the "strobe" gate control signal, the triggering pulse and a sequence of firs and second pulse echo threshold signals for detecting a predetermined amplitude reduction in the second pulse echo signal thereby producing a first of said means (c) output signals, and
      3. means responsive to the "strobe" gate control signal and a sequence of first and second amplitude variable pulse echo signals for detecting a predetermined amplitude ratio of said first and second pulse echo signals, thereby producing a second of said means (c) output signals, and
   d. means for utilizing the means (c) output to provide an indication of said physical properties of the test piece.

9. The apparatus of claim 8 wherein means (c) further comprises:
   4. means responsive to the "strobe" gate control signal, the absence of both means (c.2) and (c.3) output signals, and the presence of a first pulse echo threshold signal for detecting an excess of said signal amplitude, thereby producing a third of said means (c) output signals.

10. The apparatus of claim 8 wherein said means (c.2) comprises means for detecting an amplitude transposition of the first and second pulse echo signals.

* * * * *